Patented Nov. 23, 1937

2,099,814

UNITED STATES PATENT OFFICE 2,099,814

PREPARATION OF ISOPROPYL SULPHATES

Arthur Whitney Larchar, Wilmington, Del., assignor to E. I. du Pont de Nemours & Company, Wilmington, Del., a corporation of Delaware No Drawing. Application December 7, 1933,
Serial No. 701,337

6 Claims. (Cl. 260—99.12)

This invention relates to the art of producing alkyl sulphates and more particularly to a process for reacting propylene with sulphuric acid to form isopropyl sulphates.

It is well known that alkyl sulphates such as ethyl, propyl, and butyl sulphuric acids may be prepared by the absorption of the corresponding gaseous olefines in sulphuric acid of varying strengths. It is further known that these absorptions are accelerated by the catalytic action of certain metallic salts in the absorbing acid.

This invention has as an object the provision of a process for converting sulphuric acid and liquid propylene to propyl sulphates. Another object is the provision of a process whereby liquid propylene or liquid hydrocarbon mixtures rich in propylene may be converted into isopropyl sulphuric acid and di-isopropyl sulphate. A further object is the provision of a process by means of which the above mentioned objects may be advantageously accomplished in a simple, economical manner.

These objects are accomplished by the following invention wherein liquid propylene or liquid hydrocarbons rich in propylene are contacted with sulphuric acids at moderate temperatures and pressures in such a manner that intimate contact between the two liquid reactants is established.

The following examples of the invention are included for purposes of illustration but are not to be regarded as limitative.

1. Approximately two gram mols each of 87.5% sulphuric acid and liquid propylene were shaken vigorously for several minutes in an externally agitated, pressure resisting reaction vessel. The temperature was maintained at 0–10° C., while the pressure varied from 65 to 100 lbs. per sq. in. gauge during the reaction and dropped to nearly atmospheric at its conclusion. The product was light in color, essentially free from sulphur dioxide, had a specific gravity of about 1.30 as compared with 1.8 for the starting acid, and contained 27.6% of propylene. This percentage of olefine is somewhat in excess of that required to give complete conversion of the sulphuric acid to isopropyl sulphuric acid and is indicative of the formation of a moderate amount of the dialkyl derivative.

Two hundred and eighty-three grams of the crude isopropyl sulphates, prepared as described above, were diluted with 1000 grams of ice water and distilled to give 126.4 grams of isopropyl alcohol-water binary containing approximately 87.7% by weight of isopropanol. This yield of alcohol is equivalent to a 98% recovery of the olefine.

2. Two hundred and twenty-four grams or 2 mols of 87.5% sulphuric acid were charged into a small autoclave equipped with an internal cooling coil. This vessel was subjected to violent agitation, water at about 10° C. was passed through the cooling coil, and liquid hydrocarbon containing 95% propylene was injected into the tube at the rate of 10–15 grams per minute. The reaction pressure varied between 150 and 175 lbs. per sq. in. gauge and the reaction temperature from 18 to 27° C. The product showed an increase in weight of 100 g. (equivalent to the addition of 2.38 mols of propylene), had a sp. gr. of 1.19, was light in color, and contained both mono- and di-isopropyl sulphates. The total reaction time was only 8 minutes. Substantially the same results were obtained in a similar test in which the starting acid was subjected to a nitrogen pressure of 80 lbs. per sq. in., but in which the total operating pressure was 205 lbs. per sq. in. gauge. Results comparable to those described above were also obtained when the reaction mixture was held at 25–30° C. Similar results were obtained by the use of 93% sulphuric acid.

Any one of several agitation methods may be employed for expediting the action by the liquid propylene and sulfuric acid. Proper contact between the reactants may be achieved by internal stirring as in an autoclave or the entire vessel may be agitated externally. In either of the above cases the vessel may be loaded initially with full charges of acid and olefine in the proper proportions and the mixture agitated until completion of the reaction.

An alternative method which permits somewhat easier control consists in charging the vessel with either acid or olefine and pumping in the other reactant under the surface of the stirred liquid.

The examples disclose the successful use of reaction temperatures within the range of 0–30° C. Temperatures somewhat below 0, that is, 0 to −15° C., may be employed but require expensive refrigeration and owing to the increased viscosity of the sulphuric acid need additional power to effect proper agitation. Temperatures much in excess of 30° C. are to be avoided since their use gives a product containing much polymerized olefine. Thus, products formed at 50° C. are dark brown in color, contain free sulphur dioxide and considerable valueless, dark, heavy oil. While the process is operable at temperatures ranging from −10 to +40, it is preferred to carry out the process at about 25° C. in order that water may be used as the cooling medium.

The formation of isopropyl sulphates in the manner above outlined requires only a moderately high pressure. The lower limit is essentially the vapor pressure of the olefine at the reaction temperature, which, if the process is run at 25° C., corresponds to 160–165 lbs. per sq. in. gauge pressure. The upper pressure limit is of course limited only by the strength of the retaining vessel. Operation at pressure approaching the above defined lower limit is preferred when the reaction is conducted in an autoclave.

Sulphuric acid of 87.5 and 93.0% strength is used in the above examples but concentrations varying from 80–100% may be employed with complete success. Liquid propylene reacts slowly with acid weaker than 75% and its use is impractical under the conditions of this invention. The use of concentrated acid is perfectly feasible, but owing to the extreme rapidity with which it reacts with the olefine, it requires the application of a cooling medium at a very high rate if polymer formation is to be avoided. This is especially the case in that method of carrying out the process of the invention wherein an autoclave is used. The preferred acid concentration is 90–95%.

High conversions of the reactant present in the least amount can be effected with widely varying molal ratios of olefine to acid. For practical purposes an equal molal ratio of olefine to sulphuric acid is preferred. This ratio permits nearly complete fixation of hydrocarbon and therefore makes recycling unnecessary. It is true that the use of a higher ratio will give a product containing a larger percentage of propylene but such a product has been found to dissolve considerable unfixed propylene which degases on hydrolysis and distillation.

Heretofore isopropyl sulphates have been made by absorbing the gaseous olefine in acid, usually by circulating the gases and acid countercurrently through packed towers. The reaction rate is low and it is difficult to avoid polymerization if acid of high strength is used. The conduct of the reaction in the liquid phase has the following important advantages.

1. Manifold decrease in reaction time,
2. Material reduction in equipment size,
3. Elimination of polymer formation,
4. Less rigid agitation requirements, and
5. The purging of inert impurities, which proves troublesome in gaseous autoclave and tower absorptions, can be avoided.

The absence of the usual side reactions such as oxidation and polymerization is responsible for the formation of a superior product which is almost water white and from which nearly theoretical recoveries of isopropanol can be obtained on hydrolysis.

The term isopropyl sulphates as used in the specification and claims includes monoisopropyl sulphate or isopropyl sulphuric acid and diisopropyl sulphate.

As many apparently widely different embodiments of this invention may be made without departing from the spirit and scope thereof, it is to be understood that I do not limit myself to the specific embodiments thereof except as defined in the appended claims.

I claim:

1. Process for the preparation of a mixture comprising monoisopropyl sulphate with a small amount of diisopropyl sulphate comprising contacting, with agitation propylene in the liquid state at 0–30° C. with sulphuric acid at 87.5–93% concentration.

2. Process for the preparation of a mixture comprising monoisopropyl sulphate with a small amount of diisopropyl sulphate comprising contacting, with agitation 1 mole of propylene in the liquid state at 0–30° C., with 1 mole of sulphuric acid of 87.5–93% concentration.

3. Process for the preparation of a mixture comprising monoisopropyl sulphate with a small amount of diisopropyl sulphate comprising contacting, with agitation 1 mole of propylene in the liquid state at 0–30° C., with 1 mole of sulphuric acid of 87.5–95% concentration.

4. Process for the preparation of a mixture comprising monoisopropyl sulphate with a small amount of diisopropyl sulphate comprising contacting, with agitation 1 mole of propylene in the liquid state with 1 mole of sulphuric acid of 87.5–95% concentration at a temperature of approximately 25° C., and at a pressure of approximately 165 lbs. per sq. inch.

5. Process for the preparation of a mixture comprising monoisopropyl sulphate with a small amount of diisopropyl sulphate which comprises shaking an equimolecular mixture of 87.5% sulphuric acid and liquid propylene at 0–10° C. and 65–100 lbs. per square inch.

6. Process for the preparation of a mixture comprising monoisopropyl sulphate with a small amount of diisopropyl sulphate which comprises agitating 87.5–93% sulphuric acid while adding thereto liquid propylene, the reaction mixture being maintained at 18–30° C. and a pressure of 150–205 lbs. per square inch.

ARTHUR W. LARCHAR.